(12) United States Patent
Narasimha et al.

(10) Patent No.: US 9,370,035 B2
(45) Date of Patent: Jun. 14, 2016

(54) METHODS AND DEVICES FOR MOBILE STATION DEVICE-TO-DEVICE BEACON WINDOW DETERMINATION

(71) Applicant: Google Technology Holdings LLC, Mountain View, CA (US)

(72) Inventors: Murali Narasimha, Lake Zurich, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 167 days.

(21) Appl. No.: 14/043,904

(22) Filed: Oct. 2, 2013

(65) Prior Publication Data

US 2015/0092678 A1 Apr. 2, 2015

(51) Int. Cl.
H04W 76/02 (2009.01)
H04L 12/807 (2013.01)

(52) U.S. Cl.
CPC ............. *H04W 76/023* (2013.01); *H04L 47/27* (2013.01)

(58) Field of Classification Search
CPC ............................ H04W 76/023; H04L 47/27
See application file for complete search history.

(56) References Cited

U.S. PATENT DOCUMENTS

| | | | |
|---|---|---|---|
| 6,700,867 B2 | 3/2004 | Classon et al. | |
| 7,012,949 B2 | 3/2006 | Uesugi | |
| 8,040,815 B2 | 10/2011 | Silk et al. | |
| 8,068,454 B2 | 11/2011 | Bonta et al. | |
| 8,248,959 B2 | 8/2012 | Olexa | |
| 8,391,260 B1 | 3/2013 | Kopikare et al. | |
| 8,618,984 B2 | 12/2013 | Lin et al. | |
| 2008/0320353 A1 | 12/2008 | Blankenship et al. | |
| 2009/0180034 A1 | 7/2009 | Treigherman | |
| 2009/0232050 A1 | 9/2009 | Shen et al. | |
| 2010/0050034 A1 | 2/2010 | Che et al. | |
| 2010/0149813 A1 | 6/2010 | Powell | |
| 2011/0051640 A1 | 3/2011 | Ramesh et al. | |
| 2011/0188485 A1 | 8/2011 | Fodor et al. | |
| 2013/0138831 A1 | 5/2013 | Patil et al. | |
| 2013/0230035 A1 | 9/2013 | Grandhi et al. | |

(Continued)

FOREIGN PATENT DOCUMENTS

| | | |
|---|---|---|
| EP | 2395692 A2 | 12/2011 |
| WO | 2009118595 A2 | 10/2009 |

(Continued)

OTHER PUBLICATIONS

NEC Group, Aspects of synchronisation for D2D communication, 3GPP TSG RAN WG1 Meeting #74bis, R1-134241, Guangzhou, China, Oct. 7-11, 2013.*

(Continued)

*Primary Examiner* — Paul H Masur
*Assistant Examiner* — Kabir Jahangir
(74) *Attorney, Agent, or Firm* — Faegre Baker Daniels LLP

(57) ABSTRACT

Disclosed are methods and devices for determination of beacon windows for device-to-device communication. In one implementation, a common reference time and a set of geographical location coordinates are scanned for by a mobile station. A first beacon region is selected based on the set of geographical location coordinates. A first set of periodic beacon windows is determined based on the first beacon region and the common reference time. A device-to-device beacon transmission is scanned for during a beacon window of the first set of periodic beacon windows.

15 Claims, 7 Drawing Sheets

(56) References Cited

U.S. PATENT DOCUMENTS

| | | | | |
|---|---|---|---|---|
| 2014/0204847 A1* | 7/2014 | Belleschi | ............ | H04W 76/023 370/329 |
| 2014/0357269 A1* | 12/2014 | Zhou | ................... | H04W 76/023 455/434 |

FOREIGN PATENT DOCUMENTS

| | | | |
|---|---|---|---|
| WO | 2012047457 A1 | 4/2012 | |
| WO | 2012052598 A1 | 4/2012 | |

OTHER PUBLICATIONS

Ericsson, "Synchronization Procedures for D2D Discovery and Communication," 3GPP TSG RAN WG1 Meeting #74bis, R1-134720, Guangzhou, China, October 7-11, 2013.*

Ericsson, ST-Ericsson, "Synchronization Procedures and Signals for D2D Discovery and Communication," 3GPP TSG-RAN WG1 #74, R1-132911, Barcelona, Spain, Aug. 19-23, 2013.*

Institute for Information Industry (III), "Discussion on network assisted D2D discovery," 3GPP TSG RAN WG1 Meeting #73, R1-132540, Fukuoka, Japan, May 20-May 24, 2013.*

European Patent Office, International Search Report and Written Opinion for PCT Application No. PCT/US2014/050648 (related to above-captioned patent application), mailed Nov. 19, 2014 (12 pages).

Fodor, Gábor, et al. "Design aspects of network assisted device-to-device communications." Communications Magazine, IEEE 50.3 (2012): 170-177.

Doppler, Klaus, et al. "Device-to-device communication as an underlay to LTE-advanced networks." Communications Magazine, IEEE 47.12 (2009): 42-49.

Lei, Lei, et al. "Operator controlled device-to-device communications in LTE-advanced networks." Wireless Communications, IEEE 19.3 (2012): 96-104.

3GPP TSG RAN #65, R1-111863, Change Request on "Rate coaching parameters for CA" NTT DoCoMo et al., Barcelona, Spain May 9-13, 2011, all pages.

Chi-Ming Wong: "A Novel Beacon Frame Scheduling Algorithm Based on Cluster-Tree IEEE 802.15.4 Wireless Sensor Networks", Proceedings of the 2012 IEEE ICCS, pp. 285-289.

Vishnevsky, Vladimir et al.; "Beaconing for MDA Support in IEEE 802.11S Mesh Networks", The 18th Annual IEEE International Symposium on Personal, Indoor and Mobile Radio Communications(PIMRC'07), all pages.

Koubaa, Anis et al.: "TDBS: a time division beacon scheduling mechanism for ZigBee cluster-tree wireless sensor networks", Real-Time Syst DOI 10.1007/s11241-008-9063-4, Springer Science+Business Media, LLC 2008, all pages.

* cited by examiner

METHODS AND DEVICES FOR MOBILE STATION DEVICE-TO-DEVICE BEACON WINDOW DETERMINATION

CROSS-REFERENCE TO RELATED APPLICATIONS

The present application claims the benefit of priority from U.S. Provisional Patent Application No. 61/864,875, filed Aug. 12, 2013, and from U.S. Provisional Patent Application No. 61/877,338, filed Sep. 13, 2013.

TECHNICAL FIELD

The present disclosure is related generally to wireless network communications and, more particularly, to determination of beacon windows for device-to-device ("D2D") communication.

BACKGROUND

D2D communication allows wireless mobile stations to communicate directly with one another with minimal use of network resources. To set up a typical D2D communication session in a Long Term Evolution ("LTE") network, the enhanced Node B ("eNB") allocates radio network resources (e.g., a portion of the cellular spectrum, which can be expressed in terms of sets of resource blocks in specific subframes) for mobile stations and broadcasts information about the allocated radio network resources. Using the allocated resources, the mobile stations can discover each other, establish a D2D communication session, and transmit and receive data among themselves without the need for the eNB to relay the data. Locating other mobile stations for D2D communication, however, requires a discovery period for transmission of, and scanning for, a D2D beacon between the mobile stations. A mobile station typically increases its power consumption in order to transmit a D2D beacon or to scan for an incoming D2D beacon. This increased power consumption reduces the mobile station's battery life more quickly.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Figure 1:
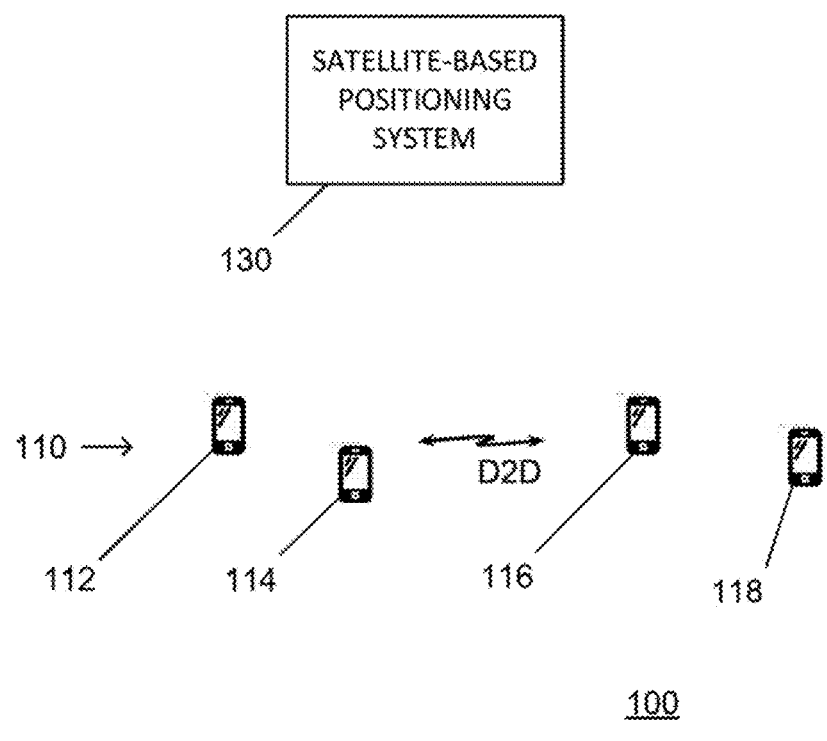
FIG. 1 is an overview of a representative communication system in which the methods of this disclosure may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The various embodiments described herein allow a mobile station to discover other mobile stations for D2D communication using beacon windows for the discovery period. Instead of scanning constantly for D2D beacons transmitted by other mobile stations (or constantly transmitting its own D2D beacon), a mobile station may scan (or transmit) only during a first window of time before discontinuing for a period of time, then scan (or transmit) during a second window of time. Reducing a duration of the discovery period for D2D communication helps to reduce the power consumption of a mobile station used for transmission of or scanning for D2D beacons. When both transmitting mobile stations (e.g., those transmitting a D2D beacon) and scanning mobile stations (e.g., those scanning for D2D beacons) utilize windows of time, however, the mobile stations use windows of time that are aligned with each other so that a D2D beacon is transmitted to a scanning mobile station.

In one embodiment, the mobile stations select the beacon window based on geographical location coordinates.

In another embodiment, the mobile stations select the beacon window based on the identity of a base station.

Turning to FIG. 1, a block diagram 100 of an embodiment of a group 110 of mobile stations is shown. The group 110 of mobile stations is configured to receive communications from a satellite-based positioning system 130. The group 110 of mobile stations includes mobile stations 112, 114, 116, and 118. Possible implementations of the mobile stations include a mobile phone (e.g., smartphone), a tablet computer, a laptop, a Machine-to-Machine device, or a combination thereof. The group 110 of mobile stations may include a mobile phone and a tablet computer.

The group 110 of mobile stations is configured to receive communications from the satellite-based positioning system 130. Possible implementations of the satellite-based positioning system 130 include the global positioning system ("GPS"), Globalnaya Navigatsionnaya Sputnikovaya Sistema ("GLONASS"), BeiDou Navigation Satellite System, Galileo navigation system, and Indian Regional Navigational Satellite System.

Figure 2:
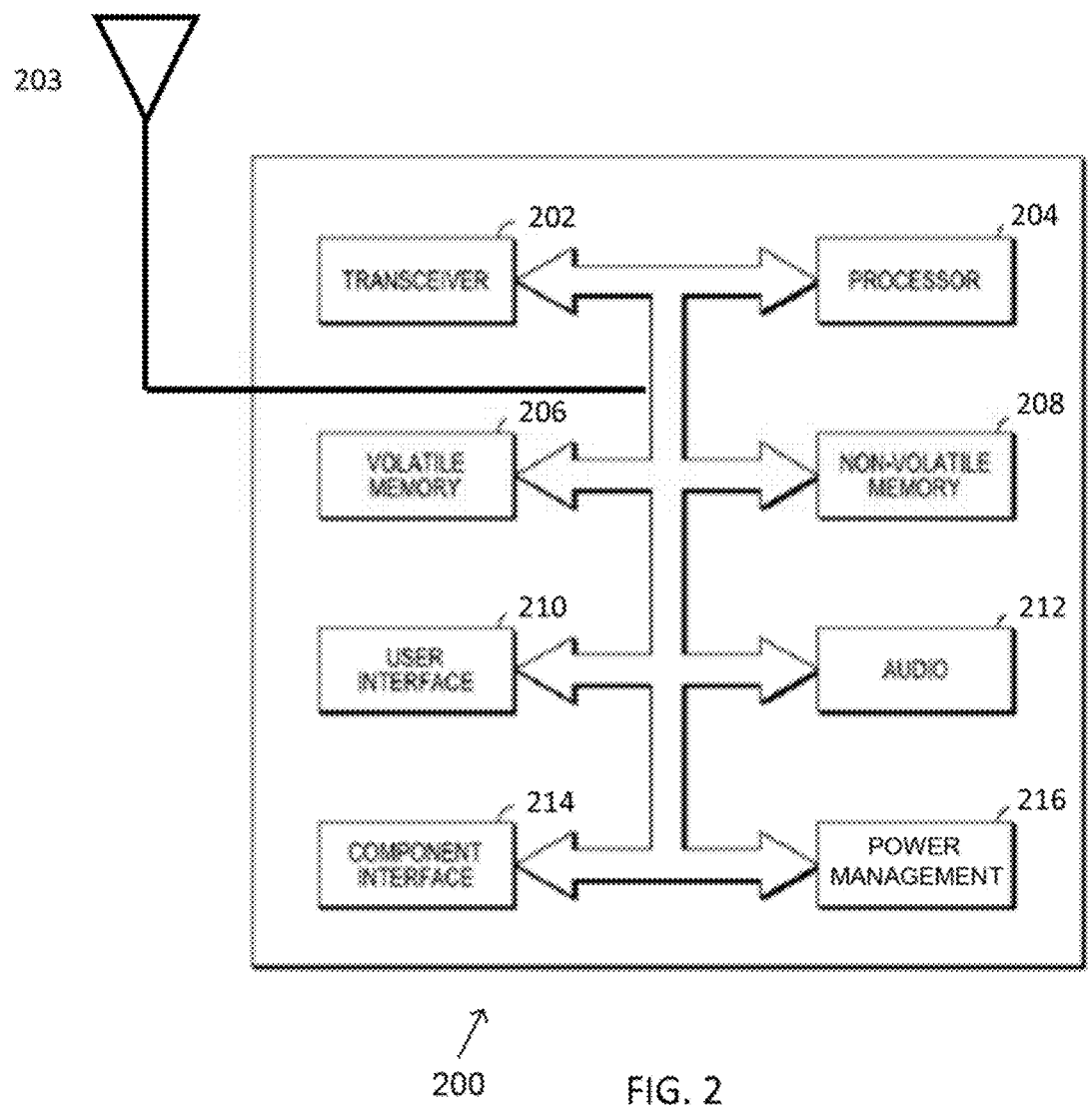
FIG. 2 is a generalized schematic of a representative mobile station.

FIG. 2 is a block diagram 200 illustrating an embodiment of a mobile station such as one of the mobile stations shown in FIG. 1. The mobile station includes a transceiver 202, which is configured for sending and receiving data over a network (e.g., a network 520 of FIG. 5). In a further example, the transceiver 202 is configured for receiving communications from the satellite-based navigation system 130. The transceiver 202 is linked to one or more antennas 203. The mobile station also includes a processor 204 that executes stored programs. The mobile station further includes a volatile memory 206 and a non-volatile memory 208. The processor 204 writes data to and reads data from the volatile memory 206 and the non-volatile memory 208. The mobile station includes a user-input interface 210 that may include one or more of a keypad, display screen, touch screen, and the like. The mobile station also includes an audio interface 212 that includes a microphone and a speaker. The mobile station also includes a component interface 214 to which additional elements may be attached. Possible additional elements include a universal serial bus interface. Finally, the mobile station includes a power-management module 216. The power-management module, under the control of the processor 204, controls the amount of power used by the transceiver 202 to transmit signals.

During operation, the transceiver 202 receives data from the processor 204 and transmits Radio Frequency ("RF") signals representing the data via the antenna 203. Similarly, the transceiver 202 receives RF signals via the antenna 203, converts the signals into appropriately formatted data, and provides the data to the processor 204. The processor 204 retrieves instructions from the non-volatile memory 208 and, based on those instructions, provides outgoing data to, or receives incoming data from, the transceiver 202. If needed, the processor 204 can use the volatile memory 206 to cache or de-cache data and instructions that the processor 204 requires to perform its functions.

In an embodiment, the user interface 210 includes a display screen, such as a touch-sensitive display that displays, to the user, the output of various application programs executed by the processor 204. The user interface 210 additionally includes on-screen buttons that the user can press in order to cause the mobile station to respond. The content shown on the user interface 210 is generally provided to the user interface at the direction of the processor 204. Similarly, information received through the user interface 210 is provided to the processor 204, which may then cause the mobile station to carry out a function whose effects may or may not necessarily be apparent to a user.

Figure 3:
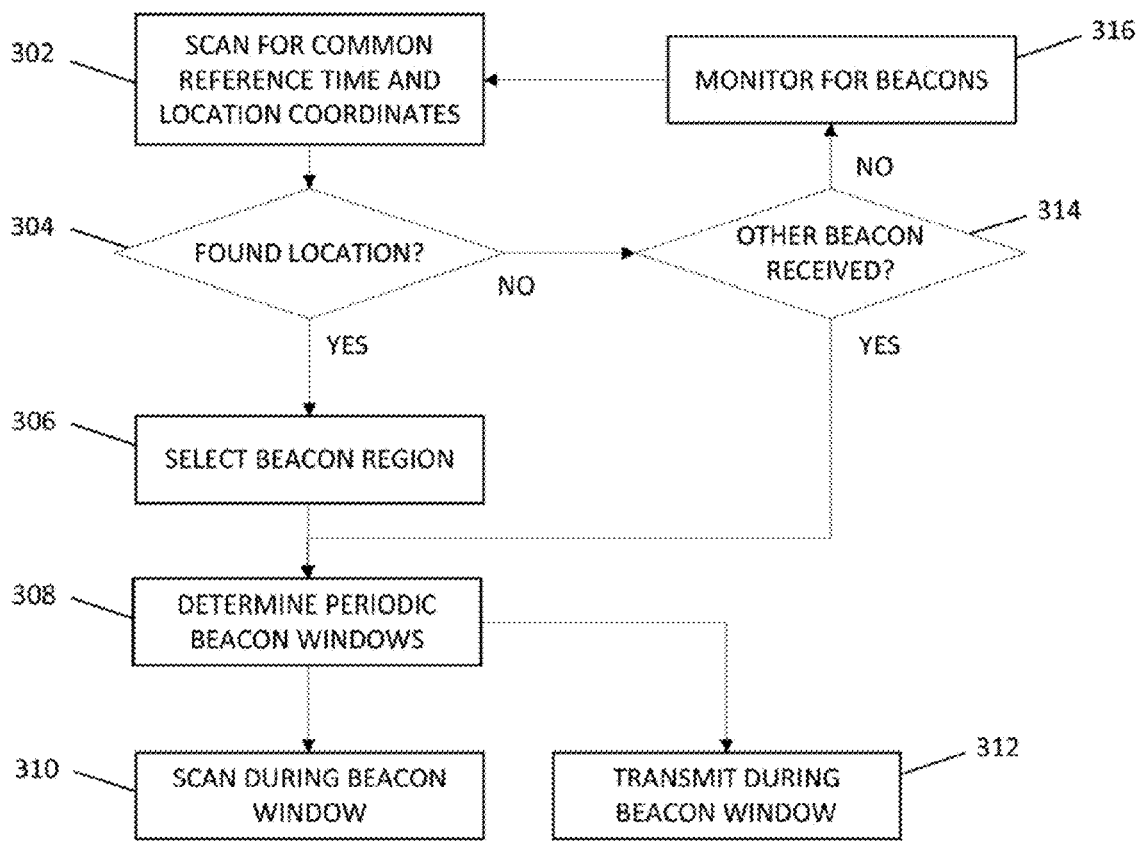
FIG. 3 is a flowchart of a method in the mobile station of FIG. 2 for the communication system of FIG. 1.
Figure 4:
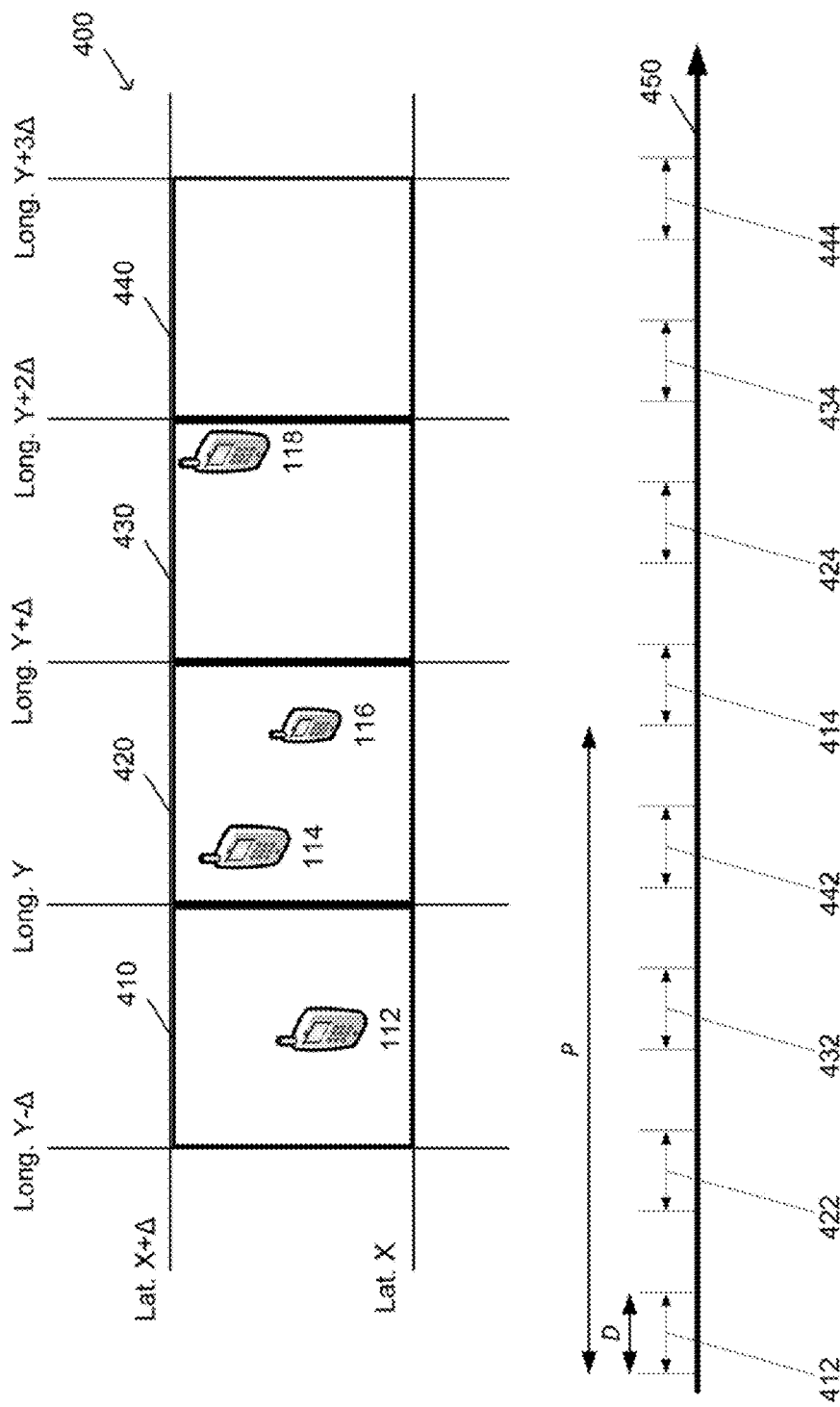
FIG. 4 is a diagram that illustrates mobile stations of FIG. 2 with a geographical grid and a partial timeline of beacon windows for the process flow of FIG. 3.

Turning to FIGS. 3 and 4, a flowchart 300 (FIG. 3) illustrates a method for determining a beacon window based on a geographical grid that may be performed by the mobile stations of FIG. 1 according to an embodiment. FIG. 4 illustrates the mobile stations of FIG. 1 with a geographical grid 400 and a partial timeline 450 of beacon windows. The geographical grid 400 provides a geographical location coordinate system based on latitude and longitude for the group 110 of mobile stations. The geographical grid 400 includes beacon regions 410, 420, 430, and 440. While only four beacon regions are shown for simplicity, the geographical grid 400 may include additional beacon regions to provide coverage for a service area (e.g., a service area of the satellite-based positioning system 130). The beacon regions of the geographical grid 400 are based on predetermined geographical areas such as tiles formed as a range of latitude and longitude coordinates. As shown in FIG. 4, the beacon regions 410, 420, 430, 440 are each between latitude values of X and X+$\Delta$, and between longitude values of Y−$\Delta$, Y, Y+$\Delta$, Y+2·$\Delta$, and Y+3·$\Delta$. Accordingly, each beacon region 410, 420, 430, 440 is a square tile of width $\Delta$. In other embodiments, however, the beacon regions 410, 420, 430, 440 are formed as rectangles, other geometric shapes, non-uniform shapes, or a combination thereof. Additionally, the beacon regions 410, 420, 430, 440 may partially overlap adjacent beacon regions. The size and shape of the beacon regions 410, 420, 430, 440 in one example are based on a transmission range or reception range of the mobile stations 110.

In the embodiment shown in FIG. 4, the mobile stations 112, 114, 116, 118 are configured to receive positioning information from the satellite-based positioning system 130, from which the mobile stations determine their respective geographical location coordinates (e.g., longitude and latitude) and a common reference time. The mobile stations 112, 114, 116, 118 are configured to select the beacon region of the geographical grid 400 in which they are currently located based on the geographical location coordinates from the satellite-based positioning system 130. In one example, the mobile stations 112, 114, 116, 118 use a mathematical formula to select the beacon region (e.g., based on predetermined values for X, Y, and $\Delta$). In another example, the mobile stations 112, 114, 116, 118 use a table lookup to select the beacon region.

In the embodiment shown in FIG. 4, each beacon region of the geographical grid 400 corresponds to a set of periodic beacon windows. The mobile stations 112, 114, 116, 118 are configured to use the set of periodic beacon windows for transmission or reception of D2D beacons. As shown in FIG. 4, the partial timeline 450 illustrates beacon windows 412, 414, 422, 424, 432, 434, 442, and 444. The beacon region 410 corresponds to a first set of periodic beacon windows, including beacon windows 412 and 414. The beacon region 420 corresponds to a second set of periodic beacon windows, including beacon windows 422 and 424. The beacon region 430 corresponds to a third set of periodic beacon windows, including beacon windows 432 and 434. The beacon region 440 corresponds to a fourth set of periodic beacon windows, including beacon windows 442 and 444. As described above, additional beacon regions may be present. In this case, the additional beacon regions may use one of the first, second, third, or fourth sets of periodic beacon windows or another set of periodic beacon windows (e.g., selected to prevent interference or overcrowding of the beacon windows).

While only two beacon windows are shown for the first, second, third, and fourth sets of periodic beacon windows, it will be apparent to those skilled in the art that additional beacon windows occur based on a predetermined period P between the beacon windows, such as a time period from a start of the beacon window 412 to a start of the beacon window 414. Accordingly, the first set of periodic beacon windows includes beacon windows starting at a time t, t+P, t+2·P, etc. As shown in FIG. 4, the first, second, third, and fourth sets of periodic beacon windows include a same predetermined period. In alternative embodiments, each beacon region 410, 420, 430, 440 may use a different predetermined period. Each beacon window 412, 414, 422, 424, 432, 434, 442, 444 includes a predetermined time duration D. In alternative embodiments, each beacon region 410, 420, 430, 440 may use different time durations.

Referring to FIG. 3, the mobile station 112 in one embodiment performs the method shown in flowchart 300. The mobile station 112 scans (302) for a common reference time and a set of geographical location coordinates. For example, the mobile station 112 scans for communications from one or more satellites of the satellite-based positioning system 130 (e.g., an L1 signal for GPS). Based on the received communications, the mobile station 112 determines a set of geographical coordinates (e.g., a longitude value and a latitude value) for its current location and a common reference time (e.g., a reference time for the satellite-based positioning system 130). As will be apparent to those skilled in the art, the mobile station 112 may not be able to determine the set of geographical coordinates, for example, due to not being able to detect a sufficient number of satellites of the satellite-based positioning system 130, poor signal quality, noise, or other factors. The mobile station 112 determines (304) whether the current location has been found.

If the current location has been found (YES at 304), then the mobile station 112 selects (306) a first beacon region based on the set of geographical location coordinates for the current location. For example, the mobile station 112 performs a table lookup to select the beacon region based on the latitude and longitude of the mobile station 112. Referring to FIG. 4, the mobile station 112 selects the beacon region 410, the mobile stations 114 and 116 select the beacon region 420, and the mobile station 118 selects the beacon region 430. The mobile station 112 determines (308) a first set of periodic beacon windows based on the first beacon region 410 and the common reference time. For example, the mobile station 112 determines a start time for the beacon window 412 based on the common reference time (e.g., using a time of 12:00:00 A.M. according to the satellite-based positioning system 130 as the start time) and a start time for subsequent beacon windows as the start time of the beacon window 412 offset by a multiple of the predetermined period P. As shown in FIG. 4, the predetermined period P is equal to sixteen seconds, and the predetermined time period D is equal to two seconds. Thus, the mobile station 112 determines a start time for the beacon window 414 as 12:00:16 A.M. The mobile station 112 in one example scans (310) for a D2D beacon transmission during a beacon window of the first set of periodic beacon windows. Referring to FIG. 4, the mobile station 112 scans for D2D beacons during beacon windows 412 and 414, the mobile stations 114 and 116 scan for D2D beacons during beacon windows 422 and 424, and the mobile station 118 scans for D2D beacons during beacon windows 432 and 434.

In another example, the mobile station 112 transmits (312) a D2D beacon only during beacon windows of the first set of periodic beacon windows. The D2D beacon in one example includes a signal that indicates an identifier of the mobile station 112. Indication of the identifier of the mobile station can include explicitly including the identifier in the D2D beacon or implicitly signaling the identifier (for example, scrambling at least a portion of the D2D beacon with the identifier). In place of, or in addition to, the identifier of the mobile station performing the transmission, the beacon transmission can indicate an identifier of a group of which the mobile station is a member. In a further example, the D2D beacon includes reference-time information (e.g., a start time, duration, end time, or predetermined period P of the beacon window during which the D2D beacon is transmitted). The reference-time information in the D2D beacon allows the mobile station 114 (or another mobile station) that receives the D2D beacon to synchronize its own beacon window start times. For example, both mobile station 112 and 114 use the common reference time for the determination of beacon windows. The identifier of the mobile station 112 in the D2D beacon allows the mobile station 114 to send a response message to the mobile station 112 for initiation of a D2D communication session. The mobile station 112 in one example transmits the D2D beacon during only a portion of the beacon window. In this case, the mobile station 112 selects a time duration d within a beacon window of the first set of periodic beacon windows such that a start and an end of the time duration d occur within the beacon window. The mobile station 112 may select the time duration d randomly or based on other factors (e.g., an identification number of the mobile station or a phone number associated with the mobile station).

Based on the above mentioned steps, the mobile station 114 is more likely to discover the mobile station 116 than to discover the mobile stations 112 and 118. Also, the mobile station 116 will be more likely to discover the mobile station 114 than to discover the mobile stations 112 and 118. In one embodiment, the group 110 of mobile stations is further configured to select (306) at least one second beacon region for scanning (310) or for transmitting (312). In one example, the mobile station 112 selects a second beacon region that is geographically adjacent to the first beacon region. For example, the mobile station 112 selects the beacon region 420 (in addition to the beacon region 410), the mobile stations 114 and 116 select the beacon regions 410 and 430 (in addition to the beacon region 420), and the mobile station 118 selects the beacon regions 420 and 440 (in addition to the beacon region 430). In another example, the mobile station 112 is within two partially overlapping beacon regions, which it selects as the first and second beacon regions. The mobile station 112 determines (308) at least one second set of periodic beacon windows based on the common reference time and the corresponding at least one second beacon regions. The mobile station 112 scans (310) or transmits (312) as described above with respect to the first beacon region. Accordingly, the mobile station 112 is more likely to scan and receive a D2D beacon from mobile stations 114 and 116, the mobile stations 114 and 116 are more likely to receive a D2D beacon from mobile stations 112 and 118, and the mobile station 118 is more likely to receive a D2D beacon from mobile stations 114 and 116.

If the current location has not been found (NO at 304), then the mobile station 112 in one example determines (314) whether a D2D beacon has been received from another mobile station. If no D2D beacon has been received, then the mobile station 112 scans (316) for D2D beacons and returns to scanning (302) for the common reference time and the set of geographical location coordinates. In one example, the mobile station 112 scans continuously for D2D beacons. In another example, the mobile station 112 scans for a burst period and then discontinues scanning for a rest period (e.g., to conserve battery life). The burst period and rest period in one example are based on system parameters such as the predetermined period P or predetermined time period D.

If the mobile station 112 has received a D2D beacon (YES at 314), then the mobile station 112 in one example uses reference-time information included within the received D2D beacon for determining (308) the periodic beacon windows. For example, if the reference-time information includes a start time, a duration (or end time), and predetermined period P of the beacon window during which the D2D beacon is transmitted, then the mobile station 112 may determine the beacon window and subsequent beacon windows for the set. The reference-time information can additionally include a time offset from the time of the start of the beacon window to the time of the actual transmission of the beacon by the transmitting mobile station. This enables the receiving mobile station 114 to accurately determine the start and end of the beacon windows.

The D2D beacon can additionally include location information such as location coordinates of the mobile station transmitting the D2D beacon. The mobile station 112 in one example uses the location information in one or more received D2D beacons to determine or approximate its own location coordinates. The approximate location information may be used by applications on the mobile station 112. The approximate location information may also enable the mobile station 112 to more quickly obtain its location coordinates from the satellite-based positioning system 130.

While the embodiments are described using the satellite-based positioning system 130, it should be appreciated that alternate embodiments may use other positioning systems instead of or in addition to the satellite-based positioning system 130. For example, an indoor positioning system based on WiFi access points can be used to determine location coordinates.

According to another embodiment, one or more of the mobile stations 112, 114, 116, 118 transmitting the D2D beacons also function as access points (such as a WiFi access point) or low-power base stations (such as a femto base station). Such an access point or base station can use the methods described to enable mobile stations to more efficiently detect the access point or base station, without requiring frequent beacon transmissions from the access point or base station.

According to another embodiment, the mobile station 112 uses the location information to determine resources in the frequency domain for transmission of the D2D beacon. This enables the mobile station 112 to scan only specific frequency resources for the D2D beacon. The mobile station 112 determines its location coordinates and a beacon region as described above. The mobile station 112 then determines a set of frequency resources based on the beacon region. For example, the frequency resources could be a carrier frequency selected from a set of available carrier frequencies or resource blocks selected from a set of available resource blocks. The mobile station 112 then monitors for D2D beacons in the determined set of frequency resources. In another example, the mobile station 114 needs to perform transmission of a D2D beacon and similarly determines its location coordinates and a beacon region. The mobile station 114 then determines a set of frequency resources based on the beacon region. The mobile station 114 performs transmission of the D2D beacon in the determined frequency resources. Thus D2D beacon transmissions in adjacent beacon regions occur in different frequency resources, minimizing interference that can occur among beacon transmissions of D2D devices.

According to yet another embodiment, the mobile station 112 uses the location information to determine both the beacon window and the frequency resources for transmission of the D2D beacon. For example, the mobile station 112 determines its location coordinates and a beacon region as described above. The mobile station 112 determines a beacon window based on the beacon region as described above. The mobile station 112 then determines a set of frequency resources based on the beacon region. For example, the frequency resources could be a carrier frequency selected from a set of available carrier frequencies or resource blocks selected from a set of available resource blocks. The mobile station 112 then monitors for D2D beacons in the determined set of frequency resources during the beacon window. In another example, the mobile station 114 needs to perform transmission of a D2D beacon and determines its location coordinates and a beacon region as described above. The mobile station 114 determines the beacon window based on the beacon region as described above. The mobile station 114 then determines a set of frequency resources based on the beacon region. The mobile station 114 performs transmission of the D2D beacon in the determined frequency resources during the beacon window. The transmission of the D2D beacon can occur during only a portion of the beacon window.

Figure 5:
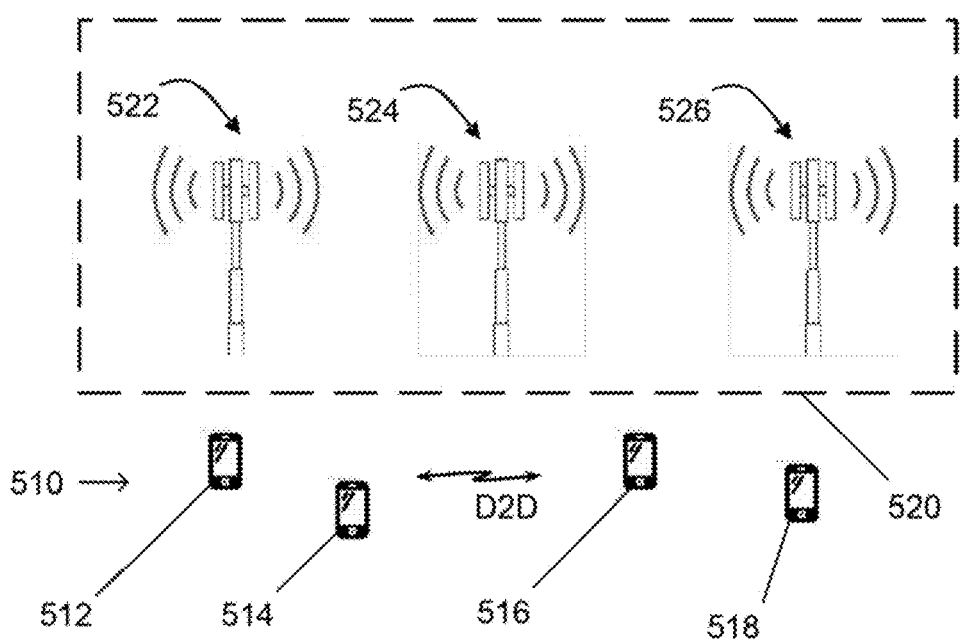
FIG. 5 is an overview of another representative communication system in which the methods of this disclosure may be practiced.

Turning to FIG. 5, a block diagram 500 illustrates an embodiment of a group 510 of mobile stations and a wireless network 520. The group 510 of mobile stations is configured to receive communications from the network 520. The group 510 of mobile stations includes mobile stations 512, 514, 516, and 518. Possible implementations of the mobile stations include a mobile phone (e.g., smartphone), a tablet computer, a laptop, a Machine-to-Machine device, or a combination thereof (e.g., the group 510 of mobile stations may include a mobile phone and a tablet computer). The mobile stations 512, 514, 516, 518 in one example include a mobile station as shown in FIG. 2.

The network 520 is configured to use one or more Radio Access Technologies, examples of which include Evolved Universal Terrestrial Radio Access ("E-UTRA"), Institute of Electrical and Electronics Engineers ("IEEE") 802.11, and IEEE 802.16. The network 520 includes base stations 522, 524, and 526. Possible implementations of the base stations 522, 524, 526 include an E-UTRA base station, an eNB, a transmission point, a remote radio head, a home eNB, an 802.11 access point, a femtocell, a mobile station configured as a mobile hotspot, and an IEEE 802.16 base station. In one embodiment, the base stations 522, 524, 526 are eNBs that control a macrocell of the network 520, and the network 520 is an LTE network. The base stations 522, 524, 526 may include multiple network entities. For example, the base station 522 may in fact be two or more base stations operating in conjunction with one another to operate as a single base station or network entity. The base stations 522, 524, 526 may also be a portion of another network entity.

The group 510 of mobile stations in one embodiment is configured to communicate with the base stations of the network 520 such as in a "connected" or "idle" mode. In the embodiment shown in FIG. 5, the base station 522 serves the mobile stations 512 and 514 (e.g., as a primary serving cell), and the base station 524 serves the mobile stations 516 and 518. In a further example, the mobile station 514 also receives communications from the base station 524 (e.g., as a neighbor cell), the mobile station 516 receives communications from the base station 522, and the mobile station 518 receives communications from the base station 526.

The mobile stations 512, 514, 516, 518 and base stations 522, 524, 526 of FIG. 5 are only representative, and the number shown is intended to facilitate description. In fact, the network 520 may have many base stations or other network entities, and the network 520 may be in communication with many mobile stations. For example, if the network 520 is an LTE network, then there are likely many eNBs controlling many macrocells, and many users may be moving within and between the macrocells, with their mobile stations connected to one or more of the macrocells.

In some embodiments, one or more of the mobile stations 512, 514, 516, 518 are configured to perform a beacon-window determination by communicating with the network 520 and also the satellite-based positioning system 130 (as described with reference to FIGS. 1 through 4) or with multiple instances thereof. For example, the mobile stations 512, 514, 516, 518 may be configured to communicate with an LTE network, a GPS network, and a GLONASS network.

Figure 6:
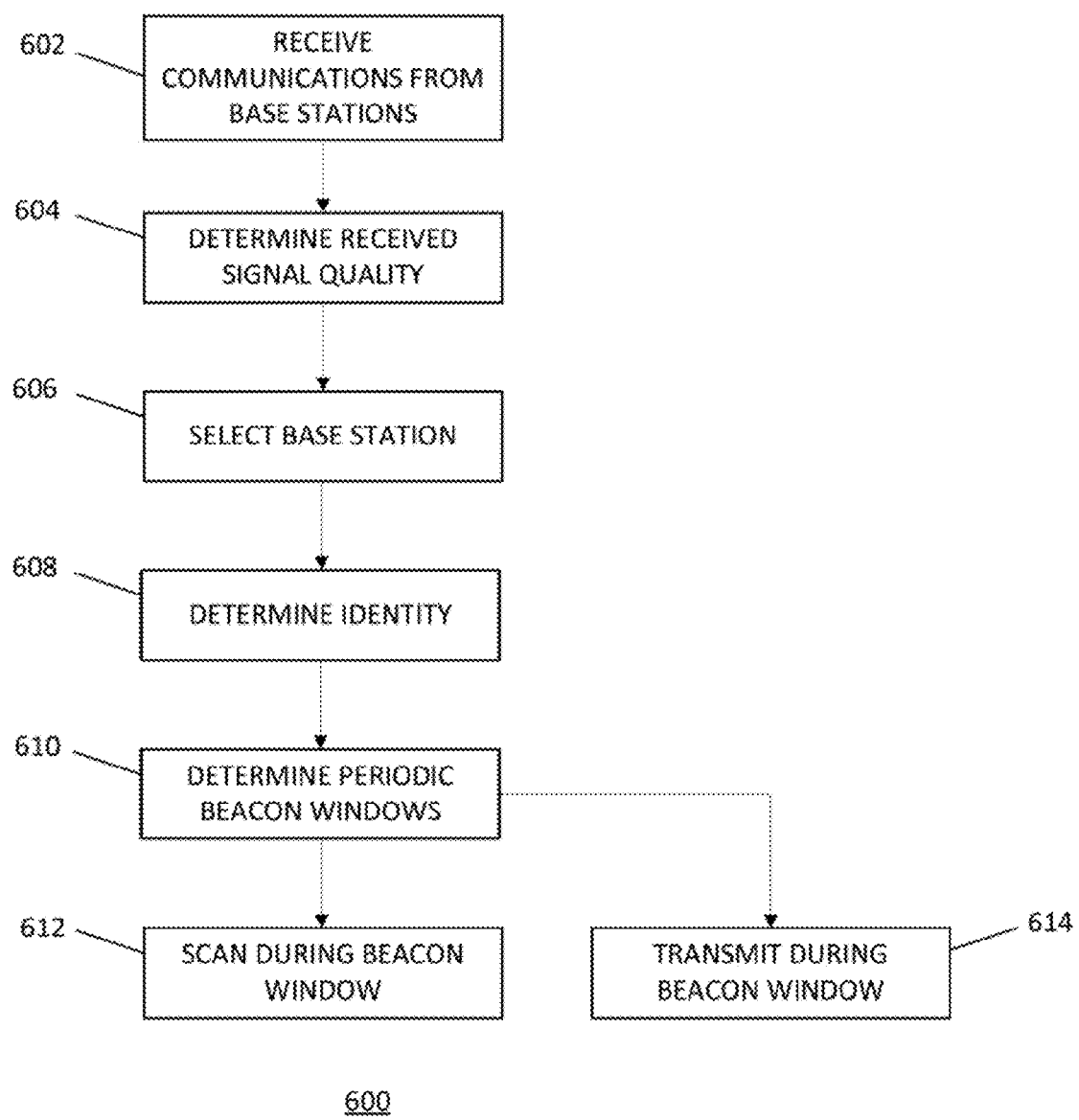
FIG. 6 is a flowchart of another method in the mobile station of FIG. 2 for the communication system of FIG. 5.
Figure 7:
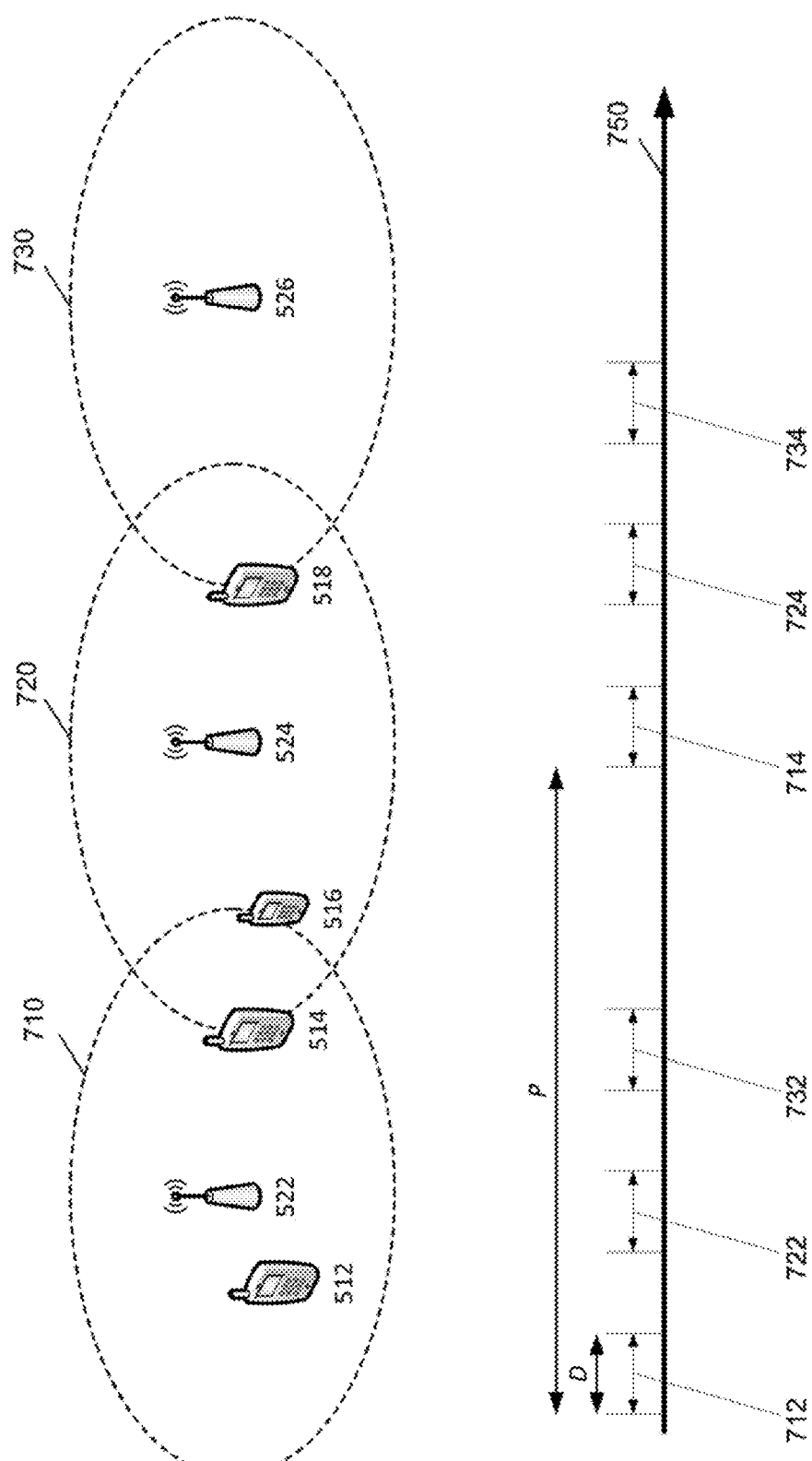
FIG. 7 is a diagram that illustrates the mobile stations of FIG. 5 with base stations of a wireless network and a partial timeline of beacon windows for the process flow of FIG. 6.

Turning to FIGS. 6 and 7, a flowchart 600 (FIG. 6) of one embodiment of a method for determination of a beacon window based on a base-station identity that may be performed by the mobile stations 510 of FIG. 5 is shown. FIG. 7 is a diagram illustrating the mobile stations 510 with the base stations 522, 524, 526 and a partial timeline 750 of beacon windows. The base stations 522, 524, 526 provide respective service coverage areas 710, 720, 730. The service coverage areas 710, 720, 730 in one example are identified by an identity of the corresponding base station such as a base-station identity, physical-cell identifier, or global identifier of an eNB. The service coverage areas 710, 720, 730 may partially overlap, as shown in FIG. 7.

In the embodiment shown in FIG. 7, each service coverage area 710, 720, 730 and thus each base-station identity corresponds to a set of periodic beacon windows. The mobile stations 512, 514, 516, 518 are configured to use the set of periodic beacon windows for transmission or reception of D2D beacons analogously to the beacon windows described above with reference to FIGS. 3 and 4. As shown in FIG. 7, the partial timeline 750 illustrates beacon windows 712, 714, 722, 724, 732, 734, analogous to the beacon windows shown in FIG. 4. The service coverage area 710 corresponds to a first set of periodic beacon windows, including beacon windows 712 and 714. The service coverage area 720 corresponds to a second set of periodic beacon windows, including beacon windows 722 and 724. The service coverage area 730 corresponds to a third set of periodic beacon windows, including beacon windows 732 and 734. Analogously to the beacon regions described above, additional service coverage areas may be present. In this case, the additional service coverage areas may use one of the first, second, or third sets of periodic beacon windows or another set of periodic beacon windows (e.g., selected to prevent interference or overcrowding of the beacon windows).

As described above, the group 510 of mobile stations communicates with the base stations of the network 520. In the embodiment shown in FIG. 7, the base station 522 serves the mobile stations 512 and 514 (e.g., as a primary serving cell), and the base station 524 serves the mobile stations 516 and 518. The mobile station 514 in one example also receives communications from the base station 524 (e.g., as a neighbor cell), the mobile station 516 also receives communications from the base station 522, and the mobile station 518 also receives communications from the base station 526. The group 510 of mobile stations may receive communications from other base stations (not shown) of the network 520 or of other networks (not shown).

Referring to FIG. 6, the mobile station 514 in one embodiment performs the method shown in flowchart 600. The mobile station 514 receives (602) communications from at least one base station (e.g., nearby base stations 522 and 524). The mobile station 514 determines (604) a received signal quality for at least one of the base stations 522 and 524. The mobile station 514 in one example determines the received signal quality based on at least one of a received-signal-strength indication, a reference-signal-received power, a reference-signal-receive quality, or signal-to-interference plus noise ratio for the received communications.

Based on the received signal quality, the mobile station 514 selects (606) a first base station of the at least one base station (e.g., the base stations 522 and 524). In one example, the mobile station 514 selects the base station with the highest received signal quality (e.g., the base station 522). In another example, the mobile station 514 selects the base station with the smallest pathloss. Pathloss can be determined for example as a difference between a transmit power of the base station and a received power of the base station signal. The mobile station 514 determines (608) an identity of the base station 522 and determines (610) a first set of periodic beacon windows based on the identity. For example, the mobile station 514 performs a table lookup to determine beacon-window time information (e.g., a start time, duration, end time, or predetermined period P) for the first set of beacon windows. According to another example, the mobile station 514 determines the beacon-window time information based on a mathematical formula using the identity of the base station 522. The mobile station 514 then scans (612) for D2D beacon transmissions by one or more mobile stations capable of D2D communication during a beacon window of the first set of periodic beacon windows. The D2D beacon transmissions can include or indicate an identifier of the mobile station performing the transmission. In place of, or in addition to, the identifier of the mobile station performing the transmission, the beacon transmission can include or indicate an identifier of a group of which the mobile station is a member (for example, all mobile stations of police personnel in a town or a particular vicinity may include the same group identifier). The identifier allows the mobile station 514 to send a response message to the transmitting mobile station or the group for initiation of a D2D communication session.

In another example, the mobile station 514 transmits (614) a D2D beacon only during beacon windows of the first set of periodic beacon windows. The D2D beacon in one example includes a signal that indicates an identifier of the mobile station 514 (e.g., a D2D beacon that is scrambled based on the identifier). In place of or in addition to the identifier of the mobile station performing the transmission, the D2D beacon can include an identifier of a group of which the mobile station is a member. The mobile station 514 in one example transmits the D2D beacon during only a portion of the beacon window. In this case, the mobile station 514 selects a subframe, slot, or one or more symbols within the beacon window to transmit the D2D beacon. The mobile station 514 may select the subframe, slot, or symbols randomly or based on other factors (e.g., an identification number of the mobile station or a phone number associated with the mobile station).

The beacon-window time information in one example includes a time offset from the start of the beacon window to a time of the actual transmission of the D2D beacon. This information can enable a mobile station that receives the D2D beacon to determine the start and end of the beacon windows even if it is not able to receive any communications from base stations.

The mobile station 514 in one example uses different frequencies or radio resources for determining the received signal strength of the base stations 522 and 524 and for scanning (612) or transmitting (614). In one example, the base station 522 operates on a first carrier frequency for downlink transmissions. In this case, the mobile station 514 determines the received signal quality based on the first carrier frequency and determines the first set of periodic beacon windows on a second carrier frequency that is different from the first carrier frequency (e.g., the carrier frequency used for uplink transmissions from mobile stations to the base station). The second carrier frequency can also be a carrier frequency that is not associated with the first carrier frequency (such as a carrier frequency in an unlicensed frequency band or a frequency used for time-division duplexing communication).

Based on the above mentioned steps, mobile station 512 is likely to discover only mobile station 514, and mobile station 516 is likely to discover only mobile station 518. In one embodiment, the group 510 of mobile stations is further configured to select (606) at least one second base station for scanning (612) or transmitting (614). In one example, the mobile station 514 selects (606) the base station with a highest received signal quality as the first base station and selects (606) the base station with a second highest received signal quality as the second base station. The mobile station 514 determines (608) the identity of the second base station as well as the first base station. In another example, the mobile station 514 selects (606) base stations with a received signal quality that meet a received quality threshold. In yet another example, the mobile station 514 selects base stations that correspond to the serving cell of the mobile station 514 and a neighbor cell of the mobile station 514.

In one embodiment, the first set of beacon periods is based on a synchronized clock of the network 520. Where a synchronized clock is not provided by the network 520, however, the mobile station 514 in one example determines the first set of periodic beacon windows based on a master information block. The mobile station 514 receives the master information block from the first base station. The mobile station 514 determines a system frame number from the master information block. The mobile station 514 determines the first set of periodic beacon windows based on the system frame number, for example, using the system frame number for a table lookup instead of the base-station identity. In a further example, the mobile station 514 selects (606) a second base station as described above and receives a second master information block from the second base station. The mobile station 514 determines a second system frame number from the second master information block and determines the second set of periodic beacon windows based on the second system frame number.

According to another embodiment, the mobile station 512 uses the base-station identity to determine resources in the frequency domain for transmission of the D2D beacon. This enables the mobile station 512 to scan only specific frequency resources for the D2D beacon. The mobile station 512 can select a base station and determine an identity of the base station as described above. The mobile station 512 then determines a set of frequency resources based on the identity of the base station. For example, the frequency resources could be a carrier frequency selected from a set of available carrier frequencies or resource blocks selected from a set of available resource blocks. The mobile station 512 then monitors for D2D beacons in the determined set of frequency resources. In another example, the mobile station 514 needs to perform transmission of a D2D beacon and similarly selects a base station and determines an identity of the base station. The mobile station 514 then determines a set of frequency resources based on the identity of the base station. The mobile station 514 performs transmission of the D2D beacon in the determined frequency resources. Thus D2D beacon transmissions in adjacent cells occur in different frequency resources, thereby minimizing interference that can occur among beacon transmissions of D2D devices.

According to yet another embodiment, the mobile station 512 uses the base-station identity to determine both the beacon window and the frequency resources for transmission of the D2D beacon. For example, the mobile station 512 selects a base station and determines an identity of the base station as described above. The mobile station 512 determines a beacon window based on the identity of the base station as described above. The mobile station 512 then determines a set of frequency resources based on the identity of the base station. For example, the frequency resources could be a carrier frequency selected from a set of available carrier frequencies or resource blocks selected from a set of available resource blocks. The mobile station 512 then monitors for D2D beacons in the determined set of frequency resources, during the beacon window. In one example, the mobile station 514 needs to perform transmission of a D2D beacon and similarly selects a base station and determines an identity of the base station. The mobile station 514 determines the beacon window based on the identity of the base station as described above. The mobile station 514 then determines a set of frequency resources based on the identity of the base station. The mobile station 514 performs transmission of the D2D beacon in the determined frequency resources and during the beacon window. The transmission of the D2D beacon can occur during only a portion of the beacon window.

It can be seen from the foregoing that methods and systems for beacon window determination have been disclosed. In view of the many possible embodiments to which the principles of the present discussion may be applied, it should be recognized that the embodiments described herein with respect to the drawing figures are meant to be illustrative only and should not be taken as limiting the scope of the claims. Therefore the techniques as described herein contemplate all such embodiments as may come within the scope of the following claims and equivalents thereof.

We claim:

1. A method in a mobile station of a wireless network, the method comprising:
    scanning for a common reference time and a set of geographical location coordinates for the mobile station, wherein the set of geographical location coordinates include a latitude and a longitude;
    selecting a first beacon region from a geographical grid of beacon regions based on the latitude and the longitude of the set of geographical location coordinates;
    determining a first set of periodic beacon windows based on the first beacon region and the common reference time; and
    scanning for a device-to-device beacon transmission during a beacon window of the first set of periodic beacon windows.

2. The method of claim 1 wherein scanning for a common reference time and a set of geographical location coordinates comprises determining the common reference time as a reference time for a satellite-based positioning system reference time and the set of geographical location coordinates as coordinates for the satellite-based positioning system.

3. The method of claim 1 further comprising:
    selecting a second beacon region that is geographically adjacent to the first beacon region;
    determining a second set of periodic beacon windows based on the second beacon region and the common reference time; and
    scanning for a device-to-device beacon transmission during a beacon window of the second set of periodic beacon windows.

4. The method of claim 1 further comprising:
    receiving a device-to-device beacon transmission that includes reference-time information;
    determining a second set of periodic beacon windows based on the reference-time information if the set of geographical location coordinates is unavailable; and
    scanning for a device-to-device beacon transmission during a beacon window of the second set of periodic beacon windows.

5. The method of claim 4 further comprising:
    transmitting a device-to-device beacon during a beacon window of the second set of periodic beacon windows.

6. The method according to claim 4 wherein the reference-time information includes a start time of the beacon window during which the transmission of the device-to-device beacon is performed.

7. The method according to claim 4 wherein the reference-time information includes a time offset from the start time of the beacon window to the time of transmission of the beacon.

8. The method according to claim 4 wherein the reference-time information includes a duration of the beacon window during which the transmission of the device-to-device beacon is performed.

9. A method in a mobile station of a wireless network, the method comprising:
    scanning for a common reference time and a set of geographical location coordinates for the mobile station, wherein the set of geographical location coordinates include a latitude and a longitude;
    selecting a first beacon region from a geographical grid of beacon regions based on the latitude and the longitude of the set of geographical location coordinates;
    determining a first set of periodic beacon windows based on the first beacon region and the common reference time; and
    transmitting a device-to-device beacon only during beacon windows of the first set of periodic beacon windows.

10. The method according to claim 9 wherein transmitting the device-to-device beacon comprises:

randomly selecting a time duration within a beacon window of the first set of periodic beacon windows, wherein a start and an end of the time duration occur within the beacon window; and transmitting the device-to-device beacon during the time duration.

11. The method of claim 9 wherein transmitting the device-to-device beacon comprises transmitting a signal that indicates an identifier of the mobile station.

12. The method of claim 9 wherein scanning for a common reference time and a set of geographical location coordinates comprises determining the common reference time as a reference time for a satellite-based positioning system reference time and the set of geographical location coordinates as coordinates for the satellite-based positioning system.

13. The method of claim 12 wherein transmitting the device-to-device beacon comprises transmitting a device-to-device beacon that includes reference-time information for the satellite-based positioning system.

14. The method according to claim 13 wherein the reference-time information includes a start time of the beacon window during which the transmission of the device-to-device beacon is performed.

15. The method according to claim 13 wherein the reference-time information includes a time offset from the start of the beacon window during which the transmission of the device-to-device beacon is performed to the time of the transmission of the beacon.

\* \* \* \* \*